Figure 1:
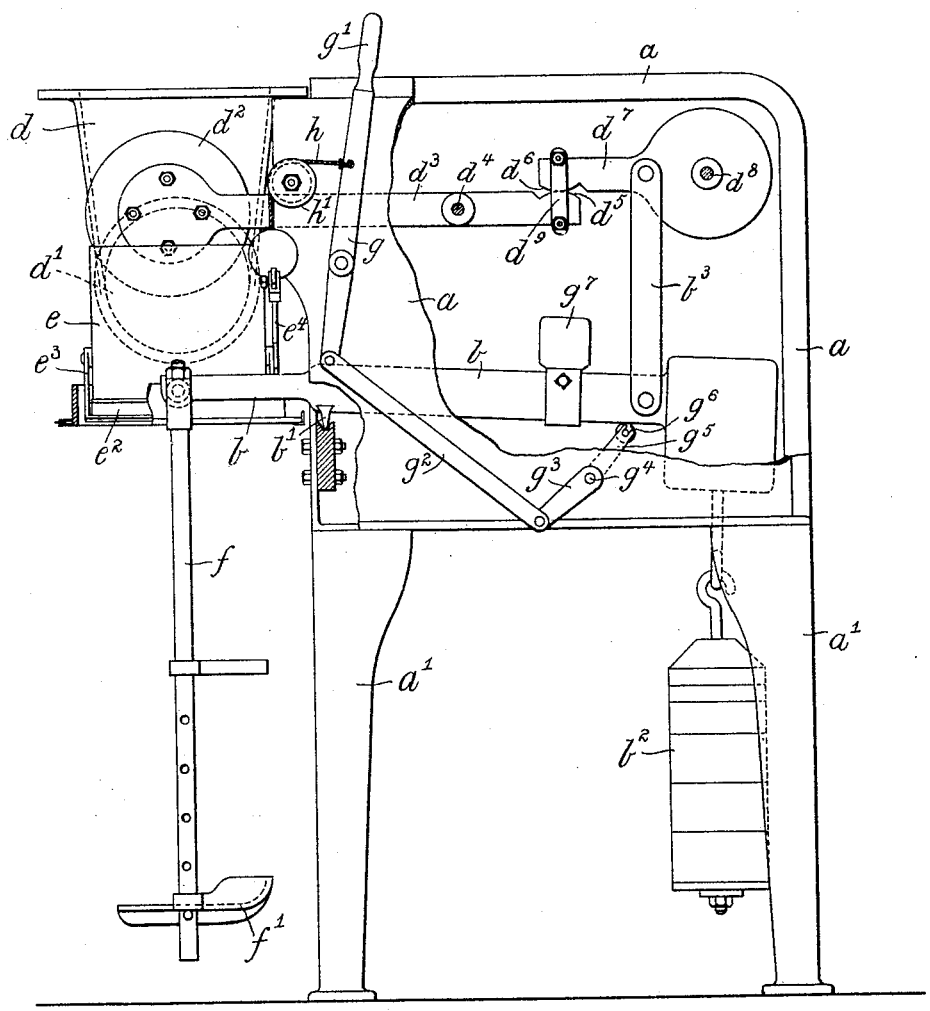

(No Model.) 2 Sheets—Sheet 1.
W. J. ELLIOTT.
AUTOMATIC WEIGHING AND BAGGING MACHINE.
No. 595,154. Patented Dec. 7, 1897.

Witnesses:
Thomas M. Smith
Richard C. Maxwell

Inventor:
William J. Elliott,
By J. Walter Douglass
Attorney.

(No Model.) 2 Sheets—Sheet 2.
W. J. ELLIOTT.
AUTOMATIC WEIGHING AND BAGGING MACHINE.
No. 595,154. Patented Dec. 7, 1897.
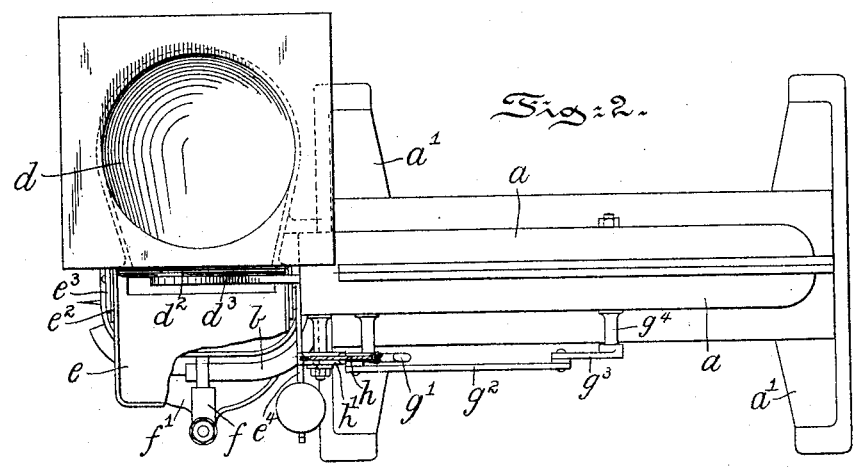
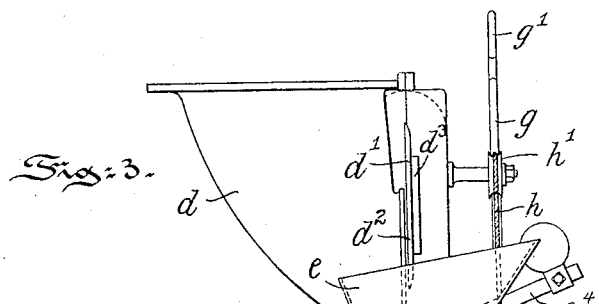
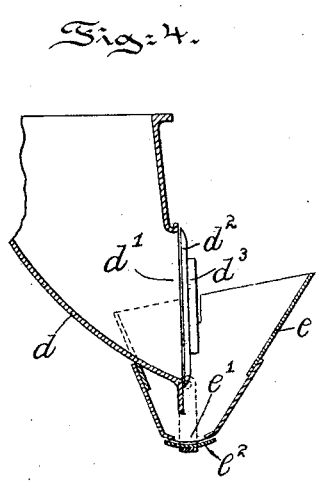
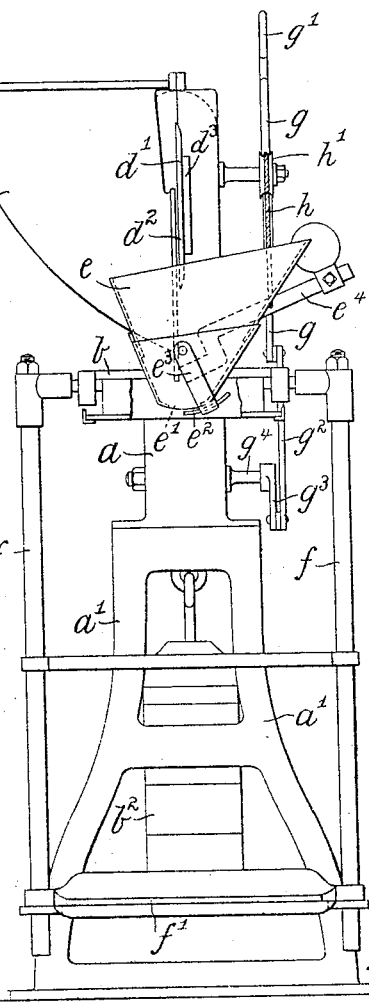
Witnesses:
Thomas M. Smith
Richard C. Maxwell
Inventor:
William J. Elliott
By J. Walter Douglass
Attorney

UNITED STATES PATENT OFFICE.

WILLIAM J. ELLIOTT, OF WILMINGTON, DELAWARE, ASSIGNOR OF ONE-HALF TO VINCENT C. WALKER AND ROBERT T. ELLIOTT, OF SAME PLACE.

AUTOMATIC WEIGHING AND BAGGING MACHINE.

SPECIFICATION forming part of Letters Patent No. 595,154, dated December 7, 1897.

Application filed August 21, 1897. Serial No. 648,985. (No model.)

*To all whom it may concern:*

Be it known that I, WILLIAM J. ELLIOTT, a citizen of the United States, residing at Wilmington, in the county of New Castle and State of Delaware, have invented certain new and useful Improvements in Automatic Weighing and Bagging Machines, of which the following is a specification.

My invention has relation to a machine for weighing and bagging materials—such, for instance, as grain, fertilizers, or the like; and in such connection it relates to the general construction and arrangement of such a machine for said purposes among others.

The principal object of my invention is to provide in a machine for automatically weighing and bagging materials—such, for instance, as grain, fertilizers, or the like—a scale-beam and a feed-hopper and a drip-hopper, both of which are stationary, valves controlling the outlets of each hopper, a shifting-lever directly controlling the outlet-valve of the drip-hopper, a friction-roll or detent operated by said shifting-lever and adapted to rest under the weighted end of the scale-beam, and mechanism controlled directly by the scale-beam for opening and closing the valve of the feed-hopper, all arranged so that when the shifting-lever is operated to open the drip-hopper valve the friction-roll or detent will be further depressed by the scale-beam when the same is lowered to operate the feed-hopper valve.

My invention, stated in general terms, consists of an automatic weighing and bagging machine constructed and arranged in substantially the manner hereinafter described and claimed.

The nature and scope of my invention will be more clearly understood from the following description, taken in connection with the accompanying drawings, forming part hereof, in which—

Figure 1 is a side elevational view of a machine embodying main features of my invention, certain portions being broken away or sectioned to more clearly illustrate the scale-beam and the mechanism controlled by said beam for operating the valves of the feed and drip hoppers. Fig. 2 is a top or plan view of Fig. 1. Fig. 3 is a front end elevation, the valves of both hoppers being illustrated as partly open. Fig. 4 is a vertical sectional view of both hoppers with both valves shown as closed, and Fig. 5 is a similar view of both hoppers with both valves open.

Referring to the drawings, $a$ represents the frame or casing, within which is inclosed the scale-beam $b$. This casing $a$ is supported on suitable standards $a'$, which also support in operative position the stationary feed-hopper $d$ and the stationary drip-hopper $e$. The feed-hopper $d$ has its outlet $d'$ arranged, preferably, in a vertical plane above the inlet to the drip-hopper $e$, which has its outlet $e'$ arranged in substantially a horizontal plane. The scale-beam $b$ is pivotally supported, as at $b'$, within the casing and is weighted at one end with suitable weights $b^2$, which measure the amount of material to be bagged. The other end of the scale-beam $b$ pivotally supports a frame or support $f$ for a platform $f'$, upon which the bag to be filled is supported during the discharge and weighing of the matter. The outlet $d'$ of the feed-hopper is controlled by a valve or cut-off $d^2$, which, as shown in the drawings, consists of a disk secured to one end of a lever-arm $d^3$, pivoted, as at $d^4$, within the casing and adjacent to the scale-beam $b$. The other end of the lever $d^3$ is rounded, as at $d^5$, and rests below a similarly-rounded projection $d^6$ of an arm $d^7$, which is pivoted, as at $d^8$, within the casing $a$. The rounded end of the lever-arm $d^3$ and the rounded end of arm $d^7$ are pivotally connected by a link or strap $d^9$, as illustrated in Fig. 1. The arm $d^7$ is pivotally connected to the weighted end of the scale-beam $b$ by a strap or link $b^3$ in such a manner that if the beam is raised or lowered a corresponding movement is given to the arm $d^7$, which in turn will, through the lever-arm $d^3$, impart a reverse movement to the disk or cut-off valve $d^2$ of the feed-hopper.

The outlet $e'$ of the drip-hopper is controlled by a slide or valve $e^2$, carried by arms $e^3$, pivoted to the sides of the drip-hopper $e$. To one or both of these arms $e^3$ is secured a weighted arm $e^4$, normally adapted to close the slide-valve. To the casing $a$ is pivoted a shifting-lever $g$, having a handle $g'$ at one end and pivotally connected at the other end to one end of a link $g^2$, which in turn is pivotally connected at its other end to a crank $g^3$, secured to a shaft $g^4$, rocking in the casing $a$ and carrying an arm $g^5$, provided with a roll $g^6$, adapted to be lowered by the weighted end of the scale-beam $b$ and permitted to rise when the scale-beam $b$ is raised. The shifting-lever $g$ is connected by a cord $h$, passing over a pulley $h'$, pivoted to the casing $a$, with the weighted arm $e^4$ controlling the slide-valve $e^2$ of the drip-hopper $e$.

The operation of the machine hereinbefore described is as follows: The feed-hopper and drip-hopper valves $d^2$ and $e^2$ being both closed, as shown at Fig. 4, the operator slightly pushes the handle $g'$ of the shifting-lever $g$ to the right. The cord $h$ slightly raises the weighted arm $e^4$, which then partly opens the valve $e^2$ of the drip-hopper. At the same time the link $g^2$ and intermediate connections will move the roll $g^6$ from beneath the weighted end of the scale-beam $b$, which then descends, and in its descent still further lowers the roll $g^6$ and also depresses through the link $b^3$ the arm $d^7$, which depresses the rounded end of the lever-arm $d^3$, thereby raising the other end of said arm $d^3$ and opening the slide $d^2$ carried thereby. The further lowering of the roll $g^6$ by the scale-beam will cause the valve $e^2$ of the drip-hopper to completely open. The material to be bagged now flows through the two hoppers and into the bag supported upon the platform $f'$. When the bag is sufficiently full and heavy, the platform $f'$ and its frame $f$ will descend, thus raising the weighted end of the scale-beam $b$ and through intermediate mechanism lowering and closing the valve $d^2$ of the feed-hopper. At the same time the roll $g^6$ will be raised by the tension on the cord $h$, maintained by the weighted arm $e^4$, and this upward movement of the roll $g^6$ will permit the shifting-lever $g$ to return to the initial position and allow of the descent of the weighted arm $e^4$ to a position in which the valve $e^2$ of the drip-hopper is completely closed.

It is to be understood that the mechanism operating the two valves is to be so arranged that they will close almost simultaneously, although the valve of the drip-hopper is permitted to open partially before the valve of the feed-hopper is opened.

It is also to be understood that the force exerted upon the weighted end of the scale-beam by the roll $g^6$ through weighted arm $e^4$ and intermediate mechanism may be compensated or neutralized either by a counterweight $g^7$ upon the scale-beam or by a corresponding increase in weights $b^2$.

Having thus described the nature and objects of my invention, what I claim as new, and desire to secure by Letters Patent, is—

1. In a machine of the character described, a scale-beam, a feed-hopper and a drip-hopper, both of which are stationary, valves controlling the outlets of each hopper, a shifting-lever directly controlling the outlet-valve of the drip-hopper, a detent resting beneath the weighted end of the scale-beam and connected with said shifting-lever, and mechanism controlled directly by the scale-beam and adapted to open and close the feed-hopper valve, all arranged so that when the shifting-lever is operated to open the outlet of the drip-hopper, the roll or detent will be actuated to permit the scale-beam to open the outlet from the feed-hopper, substantially as and for the purposes described.

2. In a machine of the character described, a feed-hopper and its outlet-valve, a drip-hopper and its outlet-valve, a weighted arm normally adapted to close the drip-hopper valve, a scale-beam adapted to directly operate the feed-hopper valve, a detent or roll resting beneath the weighted end of the scale-beam, and intermediate mechanism connecting the detent with the weighted arm controlling the drip-hopper valve, all arranged so that when the weighted end of the scale-beam falls, the detent or roll will be depressed and the weighted arm will be raised to open the drip-hopper valve and when the weighted end of the scale-beam rises the detent or roll will be raised and the weighted arm lowered to close the drip-hopper valve, substantially as and for the purposes described.

In testimony whereof I have hereunto set my signature in the presence of two subscribing witnesses.

WILLIAM J. ELLIOTT.

Witnesses:
 HARRY H. MARR,
 F. D. WALKER.